(12) United States Patent
Dehlsen et al.

(10) Patent No.: US 7,581,926 B1
(45) Date of Patent: Sep. 1, 2009

(54) SERVO-CONTROLLED EXTENDER MECHANISM FOR EXTENDABLE ROTOR BLADES FOR POWER GENERATING WIND AND OCEAN CURRENT TURBINES

(75) Inventors: James G. P. Dehlsen, Montecito, CA (US); Amir S. Mikhail, Santa Barbara, CA (US)

(73) Assignee: Clipper Windpower Technology, Inc., Carpinteria, CA (US)

( * ) Notice: Subject to any disclaimer, the term of this patent is extended or adjusted under 35 U.S.C. 154(b) by 348 days.

(21) Appl. No.: 11/084,640

(22) Filed: Mar. 18, 2005

Related U.S. Application Data

(60) Provisional application No. 60/555,503, filed on Mar. 22, 2004.

(51) Int. Cl.
*F03D 7/04* (2006.01)
(52) U.S. Cl. .............................. 416/87; 416/1; 416/32; 416/37; 416/41; 416/46; 416/48; 74/30; 74/89.17; 74/422
(58) Field of Classification Search .................... 416/1, 416/32, 37, 41, 46, 48, 51, 87, 88, 89, 169 R; 290/43–44, 54–55; 74/30, 89.17, 422, 665 A–665 E
See application file for complete search history.

(56) References Cited

U.S. PATENT DOCUMENTS

| | | | | |
|---|---|---|---|---|
| 1,077,187 A | * | 10/1913 | Bissell | 416/89 |
| 3,501,248 A | * | 3/1970 | Brocker | 416/89 |
| 3,606,571 A | * | 9/1971 | Wood | 416/87 |
| 3,814,351 A | * | 6/1974 | Bielawa | 416/87 |
| 4,180,372 A | * | 12/1979 | Lippert, Jr. | 416/41 |
| 4,453,858 A | * | 6/1984 | Guiader | 405/198 |
| 4,710,101 A | * | 12/1987 | Jamieson | 416/32 |
| 4,714,388 A | | 12/1987 | Siler | |
| 5,140,856 A | * | 8/1992 | Larsen | 416/144 |
| 5,630,705 A | * | 5/1997 | Eikelenboom | 416/89 |
| 6,705,421 B2 | | 3/2004 | Palakodati | |
| 6,726,439 B2 | * | 4/2004 | Mikhail et al. | 416/88 |
| 6,902,370 B2 | * | 6/2005 | Dawson et al. | 416/87 |
| 6,923,622 B1 | * | 8/2005 | Dehlsen | 416/87 |
| 7,042,110 B2 | * | 5/2006 | Mikhail et al. | 290/44 |
| 7,071,578 B1 | * | 7/2006 | Shibata et al. | 290/55 |

FOREIGN PATENT DOCUMENTS

GB 252461 A * 5/1926 ................ 416/88

* cited by examiner

*Primary Examiner*—Christopher Verdier
(74) *Attorney, Agent, or Firm*—Fay Sharpe LLP

(57) ABSTRACT

A power generating system wherein a turbine is mounted on top of a tower or tethered underwater. The turbine includes a rotor having a main blade connected to a rotor hub and an extender section. An adjusting device positions the extender blade between a retracted position within the main blade and to an extended position to expose more or less of the rotor to the fluid flow. The adjusting device includes a servo-controlled rack and pinion mechanism that converts rotation of the pinion by a servomotor into linear motion of the extender blade. A generator is connected to the turbine for generating electrical energy.

14 Claims, 6 Drawing Sheets

SERVO-CONTROLLED EXTENDER MECHANISM FOR EXTENDABLE ROTOR BLADES FOR POWER GENERATING WIND AND OCEAN CURRENT TURBINES

CROSS-REFERENCE TO RELATED APPLICATIONS

This application claims priority under 35 U.S.C. §119(e) of Provisional Patent Application No. 60/555,503 "Servo-Controlled Extender Mechanism For Extendable Rotor Blades For Power Generating Wind And Ocean Current Turbines", which was filed on Mar. 22, 2004 and which is incorporated herein by reference.

This application is related to commonly assigned U.S. Pat. No. 6,923,622 granted Aug. 2, 2005 on application Ser. No. 10/342,910, of Amir Mikhail, et al. filed Jan. 15, 2003, "Mechanism For Extendable Rotor Blades For Power Generating Wind And Ocean Current Turbines And Means For Counter-Balancing The Extendable Rotor Blade" which is incorporated herein by reference.

BACKGROUND OF THE INVENTION

1. Field of the Invention

This invention relates to electric power-generating devices, such as wind turbines and ocean current turbines, and more particularly to an apparatus for extending and retracting extendable rotors of horizontal axis, axial flow wind or water turbines.

2. Description of the Prior Art

U.S. Pat. No. 3,606,571 of Wood entitled "Stowed Rotor" granted Sep. 20, 1971, describes a stowed rotor mounted atop the fuselage of an airplane. The rotor includes a rotatable housing unit mounted on a vertical shaft and provided with a pair of rotor blade units that telescope into the housing unit. A mechanism is provided to extend and retract the rotor blade units from the housing unit, for the purpose of providing vertical lift during takeoff and vertical landing. The rotor blades are mechanically coupled together so that operation of one rotor blade is necessarily accompanied by duplicate and identical operation of the other rotor blade unit to thereby avoid unbalanced application of lifting and inertia forces. For opposing the reaction of the rotor blade assembly (yaw), a propeller is provided on the tail of the aircraft as in conventional helicopters.

In order to minimize friction between the rotor blade elements and the interior of the housing unit, a plurality of rollers are provided. For the purpose of providing internal structural support for the rotor blade elements, a plurality of rib stiffeners are provided to afford a stiffening action for the rotor blade elements similar to conventional aircraft wing structures.

Since a balanced lifting force must be provided under all operating conditions of the stowed rotor arrangement, a coupling system (FIG. 9) is provided which comprises a rigid arm affixed to one rotor blade and a similar arm which is affixed to the opposing rotor blade element. These transversely disposed arms are affixed at their inner ends to an endless device, which is rotatably mounted on two sprockets located on opposite distal ends of the housing unit. Thus, inward movement toward the right of one rotor blade necessarily imparts inward movement toward the left of the opposite rotor blade so that irrespective of the direction or magnitude of movement of either blade, both rotor blades necessarily are required to move in unison. One of the sprockets incorporates a reversible electric motor, which is energized and controlled by an undisclosed control means.

An aircraft may take off vertically or may be landed vertically by extending the rotor blades after imparting operating movement to the housing and rotor blades about a shaft. Rotary motion is imparted to the shaft by motive means not shown. After takeoff, when sufficient altitude is obtained, a conventional power system, such as forward thrust engines, may be employed.

The Wood patent is concerned with a stowed rotor arrangement for producing vertical lift for an aeronautical vehicle. The housing unit is mounted on the vehicle and rotatable about an axis, which is in general alignment with the direction of lift, using a pair of rotor blades telescopically mounted in the housing unit and disposed in generally transverse relation to the axis of rotation of the housing unit.

Wind and water current applications are not concerned with producing vertical lift for an aeronautical vehicle. On the contrary, in wind and current systems the rotors are mounted on a stationary structure and are rotatable about an axis, which is in general alignment with the direction of the wind or water current. In Wood, the housing unit is mounted on the vehicle and rotatable about an axis, which is in general alignment with the direction of lift, not in alignment with the wind or water current. In wind and water current applications the rotors are employed in a fundamentally different way to achieve a fundamentally different result. That is, the rotors are in alignment with the wind or water with the result that the rotors are moved by the current to produce electricity. In Wood, the rotors are in alignment with the direction of lift with the result that the rotors are moved by an engine to produce vertical lift. Wood describes a mechanism for a variable diameter rotor for aerospace applications wherein the rotor is driven by an engine and moves perpendicularly with respect to the flowing medium. Wood does not address the requirements of a wind or ocean current application, wherein the rotors are in alignment with and are driven by a flowing medium and do not move with respect to the flowing medium.

U.S. Pat. No. 3,814,351 of Bielawa entitled "Coaxial Rotor Yaw Control" granted Jun. 4, 1974, discloses coaxial counter-rotating rotors having telescoping blade tip portions which are normally partially extended. The blades of the upper and lower rotors can be differentially extended and retracted to create a resultant net torque between the rotors. The purpose is to provide yaw control by providing telescoping blade tip portions, which are differentially operated by a pilot-operated cable system that extends the tip portions of one rotor while retracting the tip portions of the other rotor.

Each blade is comprised of a hollow spar, which forms the leading edge and is the main strength member of the blade and a tapered trailing edge portion, which completes the airfoil contour of the blade. Each blade has a tip portion of reduced chord which has one end inserted into a cavity in the outboard end of the blade spar in which it is freely slidable. The tip portion is supported by two rollers on the spar, mounted at spaced points along its leading edge on pivots and by rollers mounted on pivots carried by the spar in position to engage the top and bottom tapered surfaces of the tip portion adjacent its trailing edge.

The extension and retraction of each tip portion of the upper rotor is controlled by a cable or flexible strap which is attached to the inboard end of the tip portion and passes through the hollow spar to a pulley mounted in the rotor hub by which the cable is directed downward through the hollow drive shaft. Inside the drive shaft three cables from three blades of the upper rotor are combined into a single cable. The tip portions of the lower rotor are similarly controlled by cables.

To obtain yaw control a rudder pedal is depressed, which extends one of the cables, and retracts the other cable, causing cable spools to rotate in opposite directions, one to wind up the cable(s) on one cable reel and the other to slacken its cable(s). The cables are held taut at all times by the rotating tip portions which are constantly urged outward regardless of their axial position by centrifugal forces generated by the rotating blades which are driven by the helicopter's engine.

The Bielawa patent does not address problems that arise with respect to an extendable rotor blade system that is fixed with respect to the flowing medium, whether the medium is air or water or any other fluid-flow medium.

The above prior art references describe mechanisms for aerospace applications wherein the rotor is driven by an engine and moves with respect to the flowing medium. These references do not address the requirements of a wind or ocean current applications, wherein the rotor is driven by a flowing medium and does not move with respect to the flowing medium and where durability and fatigue resistance are paramount to the success of such system, and wherein forces acting upon the rotor vary significantly during each revolution.

The mechanisms suggested in the prior art for controlling variable diameter rotors for tilt rotors and aircraft are susceptible to fatigue failures and require extensive maintenance. Wind turbines and ocean current turbines operate in environmental conditions that can quickly degrade the properties of an extension mechanism. The high maintenance requirement translates to higher energy cost, which results in a less competitive renewable energy system.

U.S. Pat. No. 4,180,372 of Lippert, Jr. entitled "Wind Rotor Automatic Air Brake", granted Dec. 25, 1979 discloses a spring-loaded pivoting end plate braking mechanism for a wind rotor. The end plate is hinged such that it is deployed by centrifugal force or a speed change detected by a sensor which controls an actuator to effect the required positioning of the brake plate into the air stream. The brake plate acts as an aerodynamic brake for wind turbines in over-speed conditions. The brake has a stationary portion fixed on the tip of the turbine rotor and a pivoting portion hinged for movement with respect to the fixed portion.

This patent teaches an aerodynamic windmill over-speed limiter which is located at the blade tip with its hinge axis transverse to the rotor blade chord such that the device has maximum effectiveness when deployed for braking and which, in its stowed position, acts to improve the aerodynamics of the rotor blade itself.

Because the brake is located at the rotor blade tip, the drag produced by the brake is at the greatest possible rotor radius such that a maximum torque braking effect is achieved. Also, when the brake plate is deployed, the trailing edge aft of the hinge line is rotated inwardly such that it is interposed over the tip area of the rotor blade. The brake, therefore, not only produces a drag at the maximum possible moment arm but, at the same time, it destroys efficient airflow over a portion of the blade that is normally very effective in driving the rotor.

It is desirable to produce the opposite effect: increasing the length of the rotor blade to improve efficient airflow over the outer extremity of the blade to increase its effectiveness in driving the rotor without introducing drag or braking.

U.S. Pat. No. 4,710,101 to Jamieson entitled "Wind Turbine" granted Dec. 1, 1987, discloses a wind turbine in which movable nose portions are located at or adjacent the leading edge of the blade and at or adjacent the tip of the blade. The nose portions are displaceable longitudinally of the blade, i.e. radially outwardly of the blade, from a normal retracted position. This moveable portion contributes to the lift of the airfoil section, and is moved to an advanced position in which drag is produced, to prevent unwanted increase in the speed of the rotation of the rotor.

The movable portion when in the normal, retracted position, will have little harmful effect on the aerodynamic shape of the airfoil section, the flow lines of the air passing from the movable portion extremely smoothly onto the remainder of the airfoil section.

The leading face of the remainder of the airfoil section has a flat or concave surface to increase the drag effect when the movable portion is in the advanced position. To further increase the drag effect, bleed passages may lead from the leading faces of the remainder of the airfoil sections, which are exposed when the movable portions are moved to the advanced position. These bleed passages can extend to a major surface of the remainder of the respective airfoil section, to cause air to flow from the leading face to said major surface to cause separation of flow and increase drag. The portion exposed may in fact include part of the operating mechanism of the movable portion, which would even further increase the drag effect.

When the speed of rotation of the rotor reaches a value, which is the maximum value, which can be tolerated, the nose portions move radially outwardly. The nose portions move either under the action of centrifugal force against the return force of springs, or together with assistance from actuators, and the leading faces are exposed. The outward movement of the nose portions will itself cause an effective reshaping of the cross-section of the blades so they do not resemble an airfoil section at all, at the tip of the blade. This destroys lift on a section of the blade where the most power is produced. It will create much more drag on the exposed section, that is the leading face, which may be contoured or roughened to produce maximum drag. The displaced nose sections create drag at a radius beyond the normal position of the tip, where the velocity is higher and the effectiveness is greater.

The present invention is concerned with the opposite effect: increasing the length of the rotor blade to improve efficient airflow over the outer extremity of the blade to increase its effectiveness in driving the rotor without introducing drag or braking.

U.S. Pat. No. 5,630,705 of Eikelenbloom entitled "Rotor Construction of Windmill" granted May 20, 1997 discloses a device for converting wind flow energy into mechanical energy. The device has a base construction and a rotor with a horizontal axis mounted on the base. The rotor has a number of elongated rotor blades, which are connected to a rotary support and extend radially therefrom. Each rotor blade or a part thereof is connected to the rotor support by a hinge connection for tilting the longitudinal axis of the rotor blade or part thereof to a predetermined orientation relative to the axis of rotation of the support. A hinge axis of the hinge connection between the rotor blade and the rotary support is directed at an acute angle both to the longitudinal axis of the rotor blade and to the axis of rotation of the support.

The maximum wind-braking area, to be used at relatively low wind speeds, is achieved when the rotor blades are at right angles to the wind direction. Pivoting the rotor blades around their longitudinal axes into the direction of the wind results in a lower wind-braking area to be used at relatively high wind speeds.

In order to increase the adjustability of the wind-breaking area to the actual wind speed, the rotor blades are formed by a number of elongated rotor blade parts, which are to be placed in a position fully or partially overlapping each other in the lengthwise direction, or essentially in line with each other. For a minimum length of such a rotor blade, the component parts of the rotor blade fully overlap each other. A maximum length of such a rotor blade is achieved if all component rotor blade parts are placed in line with each other.

FIG. 5 of Eikelenboom illustrates an elongated, hollow first rotor blade part that is hingedly connected to an arm. The first rotor blade part contains an elongated, hollow second rotor blade part. The second rotor blade part can in turn contain an elongated third rotor blade part. The rotor blade parts can be shifted relative to each other in the lengthwise direction by separate mechanisms including a motor drive, a spindle and a wire cable for each moveable part fitted in the first rotor blade part. The wire is wound on the spindle. The wires can be subjected to both tensile stress and pressure, and a separate wire, spindle, motor arrangement is connected is to the first and second rotor blade parts, respectively, for the purpose of shifting the rotor blade parts in and out relative to each other.

A disadvantage of the device shown FIG. 5 of Eikelenboom is that the first rotor blade into which the second blade part slide must be completely hollow in order to accommodate the shape of the second blade. In modern large-scale turbine the blades are of such a size that reinforcing rib supports are necessary to obtain strength in large-scale wind and water current applications. The cable mechanism itself is not suitable for large scale turbines because the wires must be capable of being subjected to both tensile stress and pressure and such cables are not available for moving heavy objects.

As can be seen from the above descriptions, in the prior art it is known that the length of a blade can be adjusted such that the wind-braking area is varied. A disadvantage of the prior art devices is the number of component parts, which makes the devices complex to build, to service and to repair.

U.S. Pat. No. 6,726,439 of Geoffrey F. Deane and Amir S. Mikhail granted Apr. 27, 2004 entitled "Extendable Rotor Blades For Power Generating Wind And Ocean Current Turbines And Means For Operating Below Set Rotor Torque Limits", discloses a control for extendable rotor blades but does not describe in detail a mechanism for extending and retracting a rotor blade on a wind or water current driven turbine.

Prior mechanisms for moving the extension blades of variable diameter rotor blades have used endless belts, wire cables, and lead-screw mechanisms attached to the extender blade.

Endless belts have the disadvantage of having to extend to the distal end of the main blade in order to effect the desired maximum of longitudinal movement, are complex to manufacture and add undesired additional weight to the outer reaches of the main blade.

Wire cables have the disadvantage of requiring two cables, one to move the extender blade out and one to pull the extender blade in. Also the cables are heavy for required strength, have to extend to the distal end of the main blade in order to effect the desired extent of longitudinal movement, are complex to manufacture and add undesired additional weight to the outer reaches of the main blade.

Lead screw mechanisms incorporate a slider nut driven by a threaded lead screw. Lead screw mechanisms are heavy for required strength, require a heavy reversible motor whose torque needs to be sufficient with a good safety margin to turn the lead screw under maximum load; have to extend to the distal end of the main blade in order to effect the desired longitudinal movement; are complex to manufacture; add undesired additional weight to the outer reaches of the main blade and tend to bind-up during operation, thereby adding to maintenance costs.

What is needed is a mechanism for wind or ocean current turbines which will facilitate extension and retraction of extendible rotor blades and which is lightweight, easily maintainable, and durable.

SUMMARY OF THE INVENTION

The present invention relates to a fluid flow (wind or water) power generating system, which includes a rotor blade capable of extension and retraction of a radius of sweep of the rotor blade to increase and decrease a cross-sectional area of fluid flow swept by the rotor blade; and, an adjusting device for the rotor blade including a servomotor-controlled rack and pinion actuation mechanism that converts rotation of the pinion by the servomotor into linear motion of the rotor blade.

In accordance with an aspect of the invention, the servomotor-controlled rack and pinion actuation mechanism includes two servomotors each with a respective pinion coupled to the rack such that the two servomotors drive their respective pinions in opposite directions, enabling the extension blade to be extended or retracted as the rack moves back-and-forth linearly.

In accordance with a further aspect of the invention, the turbine is mounted on a structure (such as a tall wind tower or a tethered underwater nacelle) that is held stationary in the horizontal axis with reference to the fluid flow. The turbine includes a rotor having a main blade connected to a rotor hub and an extender blade. An adjusting device is anchored to the main blade and connected to the extender blade such that the extender blade is moveable between a retracted position relative to the main blade and to a more exposed position to expose more or less of the rotor to fluid flow. The adjusting device includes a servomotor-controlled rack and pinion actuation mechanism that converts rotation of the pinion by the servomotor into linear motion of the extender blade. A generator is connected to the turbine for generating electrical energy.

BRIEF DESCRIPTION OF THE DRAWINGS

The invention will be described in detail with reference to the drawings in which.

In these figures, similar numerals refer to similar elements in the drawings. It should be understood that the sizes of the different components in the figures may not be to scale, or in exact proportion, and are shown for visual clarity and for the purpose of explanation.

DESCRIPTION OF THE PREFERRED EMBODIMENTS

Figure 6:
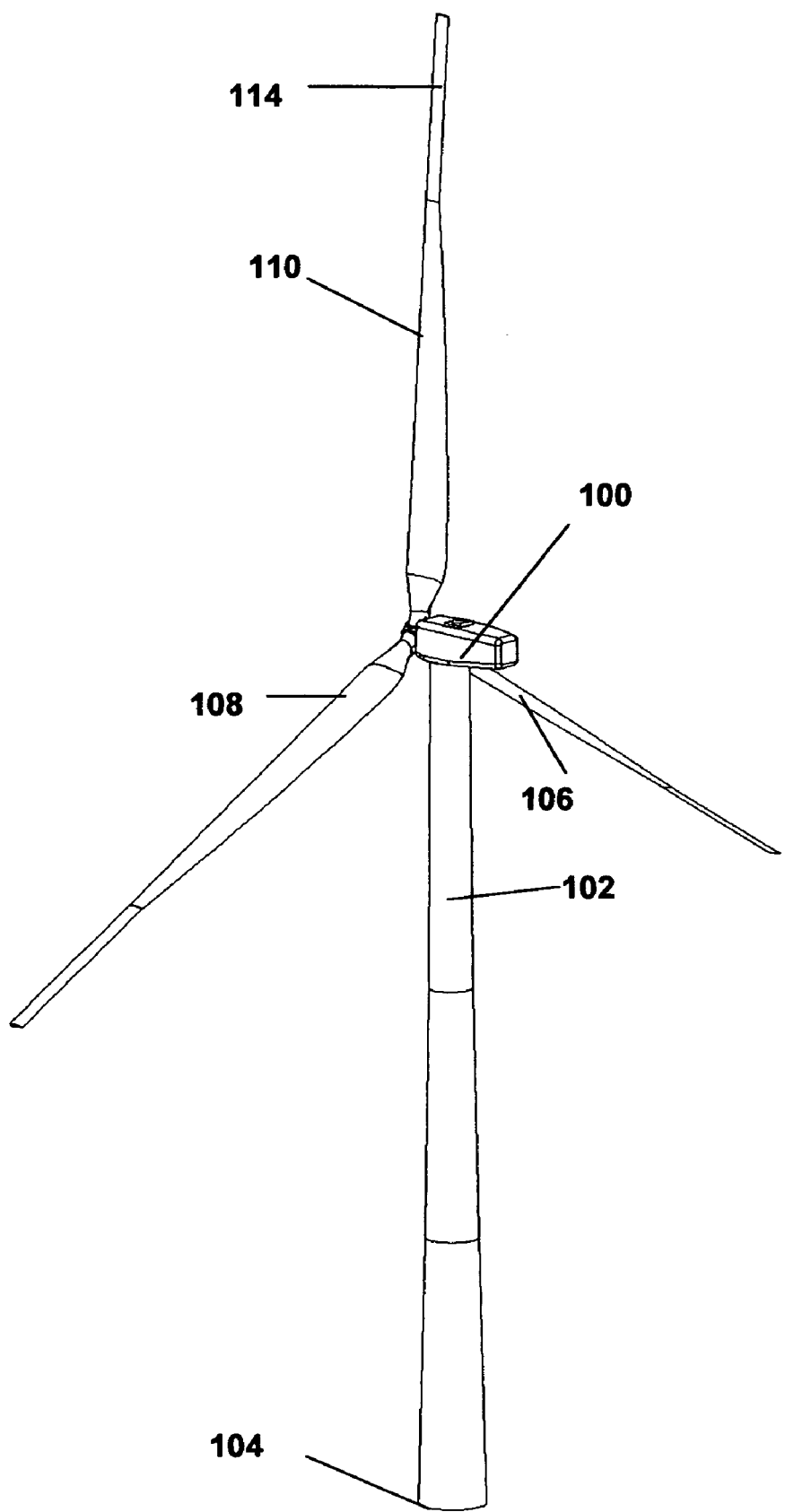
FIG. 6 is a perspective view of a wind turbine installation in which the present invention is embodied.

Refer to FIG. 6. A wind power-generating device includes an electric generator housed in a turbine 100, which is mounted atop a tall tower structure 102 anchored to the ground 104. Thus, the turbine 100 is mounted on a structure 102 that is held stationary with reference to fluid flow, wind or water. The turbine is free to rotate in the horizontal plane such that it tends to remain in the path of prevailing wind current. The turbine has a rotor with variable pitch blades 106, 108, 110, which rotate in response to wind current. Each of the blades has a blade base section referred to as a root blade attached to a rotor hub and a blade extension (for example 114 for blade 110) referred to as an extender blade that is variable in length to provide a variable diameter rotor. The rotor diameter is controlled to fully extend the rotor at low flow velocity and to retract the rotor as flow velocity increases such that the loads delivered by or exerted upon the rotor do not exceed set limits. The power-generating device is held by the tower structure in the path of the wind current such that the power-generating device is held in place horizontally in alignment with the wind current. An electric generator is driven by the turbine to produce electricity and is connected to power carrying cables inter-connecting the generator to other units and/or to a power grid.

Power capture from wind and ocean current turbines is directly proportional to the cross-sectional area swept by the turbine's rotor blades. Conventional rotors utilize blades of fixed length, joined at a rotating hub. These blades may be of variable pitch (selectively rotatable about their longitudinal axes) in order to alter the angle of attack relative to the incoming fluid flow, principally for power shedding in high flow velocities. Alternatively, these blades may be fixed pitch or stall-regulated, wherein blade lift and therefore power capture falls off dramatically as wind speeds exceed some nominal value. Both variable pitch and stall regulated rotor blades with fixed diameters are well known in the art. The above-identified U.S. Pat. No. 6,726,439 B2 describes a wind or water flow energy converter comprising a wind or water flow actuated rotor assembly. The rotor comprises a plurality of blades, wherein the blades are variable in length to provide a variable diameter rotor. The rotor diameter is controlled to fully extend the rotor at low flow velocity and to retract the rotor as flow velocities increases such that the loads delivered by or exerted upon the rotor do not exceed set limits.

Figure 1:
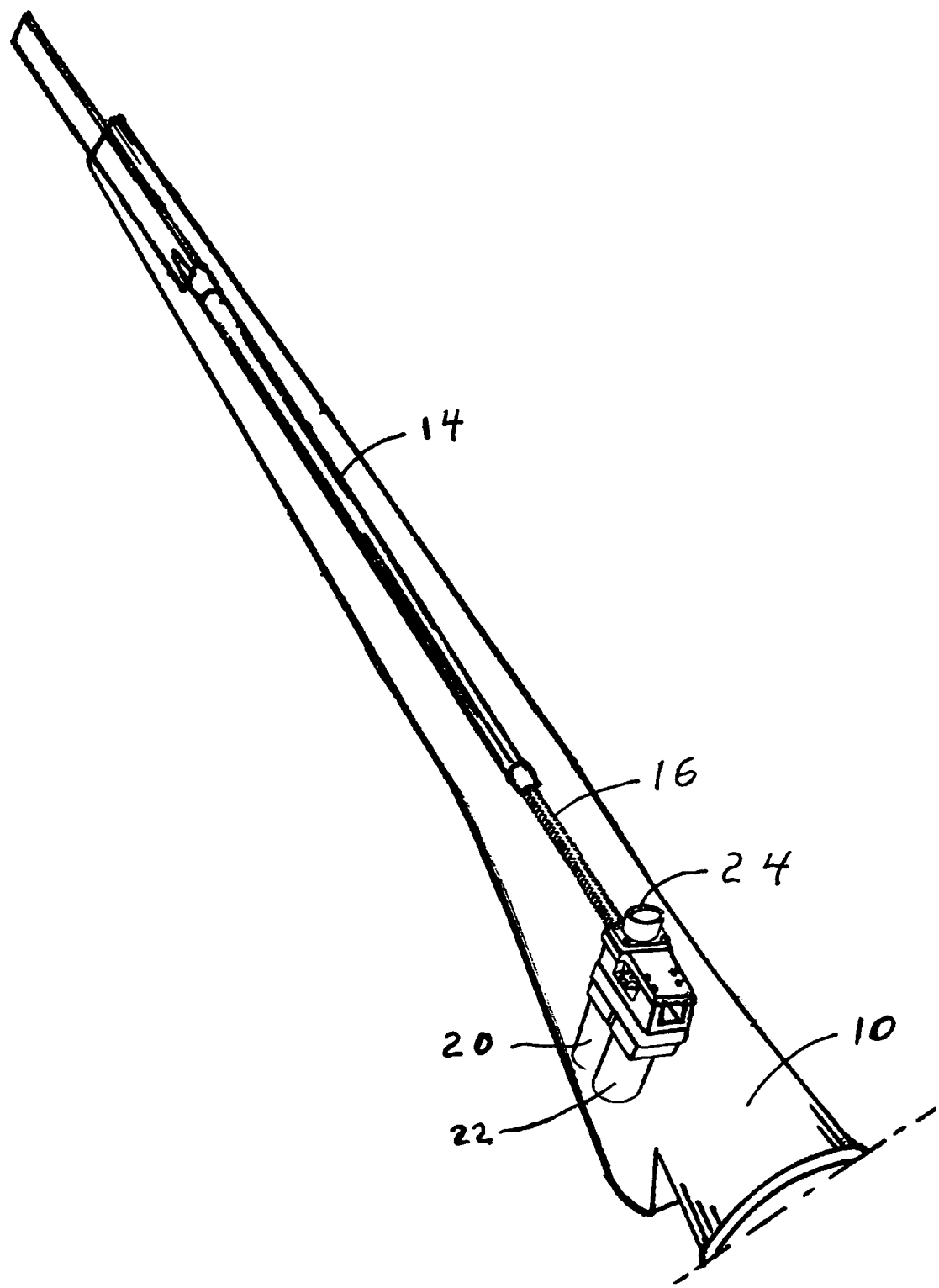
FIG. 1 is a cut-away perspective view of a servomotor-controlled rack-and-pinion actuation mechanism of the present invention with an extendible rotor blade fully extended.

FIG. 1 is a cut-away view of the servomotor controlled rack-and-pinion actuation mechanism of the present invention with the rotor fully extended. A rotor has a root blade 10 and an extender blade 12 attached to an extension bar 14 by bolts.

Extension bar 14 is connected to a rack gear 16. Servomotor 18 and pinion 20 on one side of rack gear 16 are anchored at the hub end of the root blade 10 mounted to the interior cavity of the root blade 10. A second servomotor 19 and pinion 24 may be located on an opposite side of a rack gear 16. The rack gear 16 engages the pinion gear 20 on a hub end thereof and the rack gear 16 is connected on the other end to the extension bar 14. Conventional rack and pinion gears consist of a bar gear of rectangular cross section (the rack), having teeth on one side that mesh with teeth on a small gear (the pinion). If the servomotor 18 drives pinion 20 such that it rotates about a fixed axis, the rack 16 and hence the connected extender blade 12 will move in a straight path in one direction. If the servomotor 19 drives pinion 24 such that it rotates about a fixed axis, the rack 16 and hence the connected extender blade 12 will move in a straight path in the opposite direction. Thus the two servomotors 18, 19 drive their respective pinions in opposite directions, enabling the rotor extender blade 12 to be extended or retracted as the rack moves linearly. An optional friction brake is supplied to lock the rack when the extender blade is in a desired position. The brake is activated by a hydraulic system or other activation system. For safety, the brake is applied when not activated and is released when activated. Hence the brake is always in a fail-safe condition.

Figure 2:
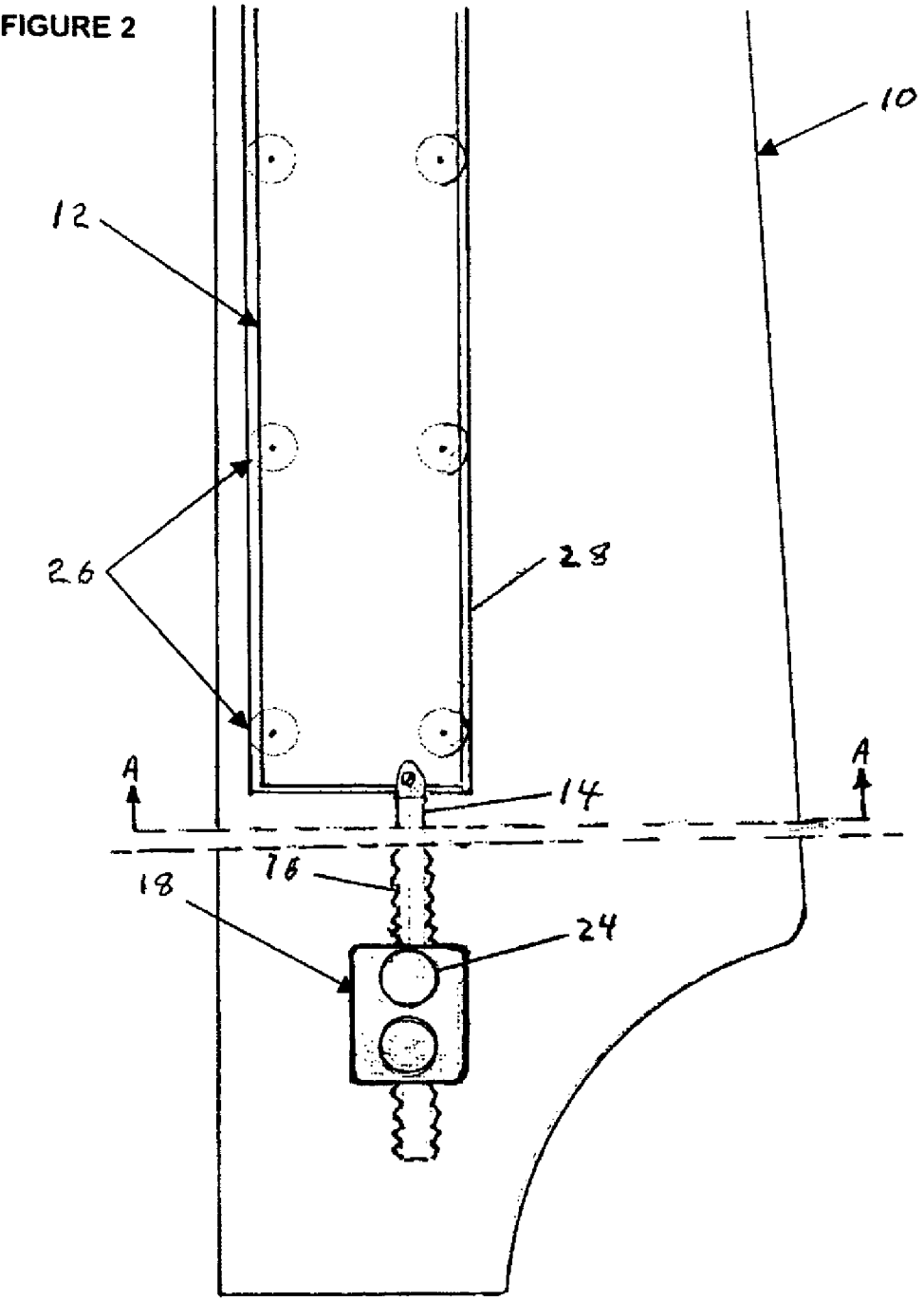
FIG. 2 is a cut-away view of the extendible rotor within the main blade near the hub end of the main blade and illustrates the location of the servomotor-controlled rack-and-pinion actuation mechanism of the present invention.

FIG. 2 illustrates a cut-away view of the extendible rotor 12 within the main blade 10 shown in FIG. 1. Bearings 26 are mounted on an inner portion of the extender blade 12. The blade extension rides within a guide 28. As the rack is moved inwards and outwards by the servomotors extension bar 14 and hence the extender blade 12 slides inwards and outwards with minimal friction because of the bearings 26. Alternatively, the bearings are mounted to the spars of the extender blade 10.

Figure 3:
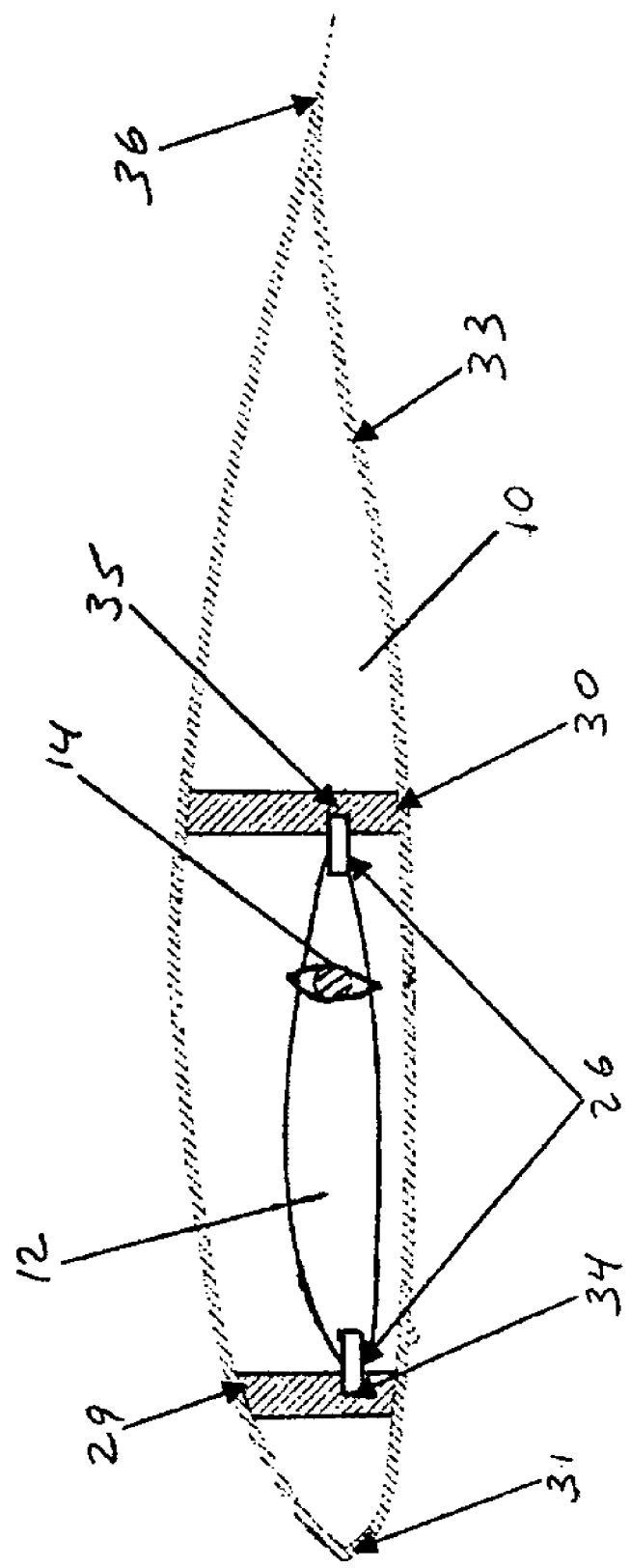
FIG. 3 is a cross sectional view of the rotor blade taken along the view line A-A of FIG. 2.

FIG. 3 shows a cross section view of the rotor blade taken along the view line A-A of FIG. 2. Each root blade portion has spaced apart ribs defining the airfoil contour of the root blade and a lengthwise front spar 29 and rear spar 30 which are the main strength members of the root blade to which the ribs are attached. Each rib forms a leading edge 31 of the root blade and a tapered trailing edge 32, which completes the airfoil contour of the root blade. The ribs are covered with a fiberglass skin 33.

The rotor extender blade 12 is housed within the root blade 10. The rotor extender blade 12 has spaced apart ribs defining the airfoil contour of the rotor blade extension and lengthwise front and rear spars, which are the main strength members of the rotor blade extension. The bearings 26 allow the extender blade 12 to roll within a space between the front and rear spars 29 and 30.

The extender blade 12 is illustrated as mounted by bearings on the extender blade 12 and guided by a front rail 34 built into the front spar 29 and a rear rail 35 built into the rear spar 30 of the root blade 10.

Figure 4:
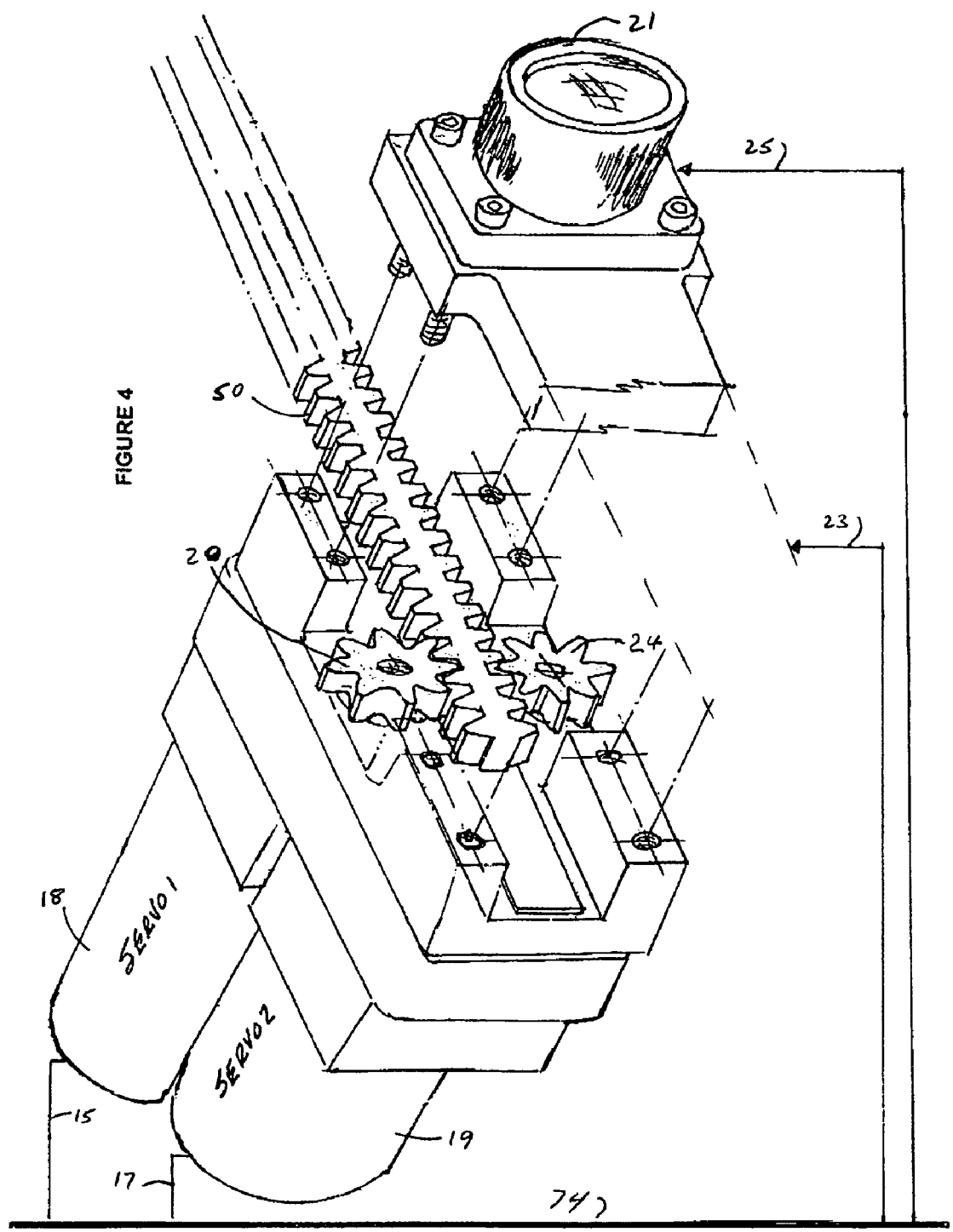
FIG. 4 is a more detailed view of the servomotor, pinion and rack shown in FIG. 1.

FIG. 4 is a more detailed view of the servomotor, pinion and rack shown in FIG. 1. Servomotor 18 and pinion 20 on one side of rack gear 16 are anchored at the hub end of the base section mounted to the interior cavity of the root blade 10. A second servomotor 19 and pinion 24 may be located on an opposite side of a rack gear 16. The rack gear 16 engages the pinion gear 20 on a hub end of rack gear 16 and the rack gear 16 is connected on the other end to the extender blade 12 by means of an extension bar 14. A conventional rack and pinion gears consist of a bar gear of rectangular cross section (the rack), having teeth on one side that mesh with teeth on a small gear (the pinion). If the servomotor 18 drives pinion 20 such that it rotates about a fixed axis, the rack 16 and hence the connected extender blade 12 will move in a straight path in one direction. If the servomotor 19 drives pinion 24 such that it rotates about a fixed axis, the rack 16 and hence the connected extender blade 12 will move in a straight path in the opposite direction. Thus the two servomotors drive their respective pinions in opposite directions, enabling the rotor extender blade 12 to be extended or retracted as the rack moves linearly. An optional friction brake 21 is supplied to lock the rack when the extender blade is in a desired position. For safety, the brake 21 is applied when not activated and is released when activated by a hydraulic system or other activation system. Hence the brake is always in a fail-safe condition. A second brake (not shown) may also be employed.

Figure 5:
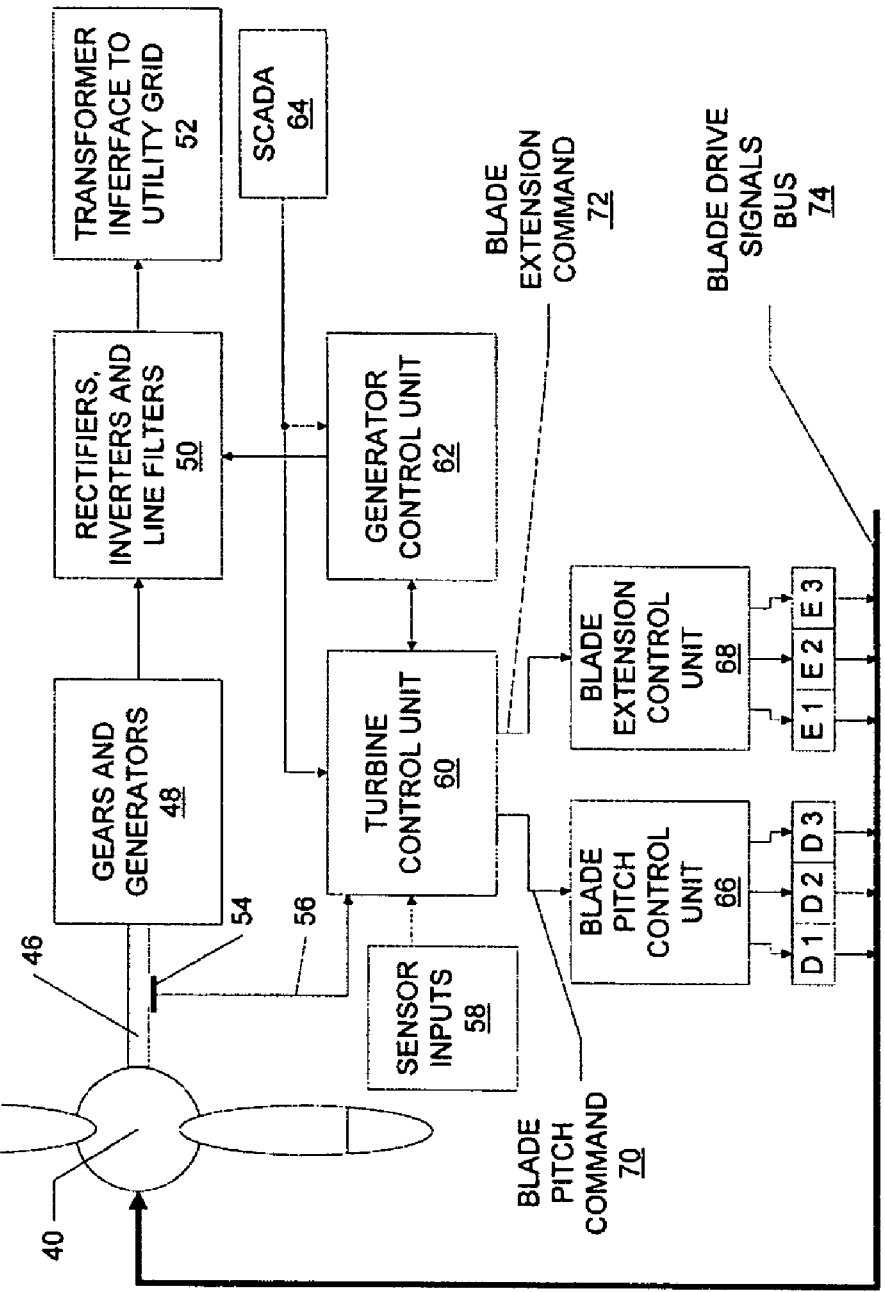
FIG. 5 is a block diagram of a wind turbine system in which the present invention is embodied.

The Turbine Control Unit 68 shown in FIG. 5 performs control functions in accordance with the methods described in U.S. Pat. No. 6,726,439. That is, a control method controls the rotor system to operate within four regions. A first of the regions being at velocities below cut-in, a second of the regions being over a range of intermediate velocities which yield varying power production, and a third of the regions being at higher velocities in which the turbines produce constant or slightly decreasing power in order to limit loads, and a fourth of the regions being at extremely high velocities in which the turbines cut-out.

In addition, the control method controls the rotor system to operate within a fifth region in which rotor diameter is varied by sending signals over bus 74 to servo 18 over signal line 15 and to servo 19 over signal line 17 to maintain operation within a specified loads regime. The specified load regime may be such that, in all wind or water flow velocities below a flow velocity required to reach rated power, the rotor diameter is extended to a maximum diameter permissible to remain within specified rotor load limits. The rotor load limits may be, for example, limitations on rotor thrust and/or shaft torque. To allow axial movement of the extendible rotor blade the two brakes must be deactivated by signals on deactivate brake 1 line 23 and deactivate brake 2 line 25.

Refer to FIG. 5, which is a block diagram of a variable-speed wind turbine apparatus in accordance with the present invention. The basic components of the system are as follows. (1) A turbine drive train including a rotor hub-mounted pitch servo system 40, blade rotor including root blade 42 and extender blade 44, gearbox and a permanent magnet generator (PMG) 48, (2) generator rectifier/inverter unit 50; (3) a control system to comprising a turbine control unit (TCU); generator control unit (GCU) 62, (4) a pad-mount transformer 52, and (5) SCADA interface 64 connecting the system to a utility grid.

For the purposes of illustration a system using one independent power conversion system including generator, filter, inverter, rectifier, etc. is illustrated herein. A turbine using a number of independent power conversion systems, including a system using a four power conversion systems as shown in application Ser. No. 10/773,851 (U.S. Pat. No. 7,042,110) is included within the scope of the disclosed invention.

The turbine comprises one or more rotor blades 42, 44 connected, via a rotor hub mounted pitch-angle servo, which is powered through slip rings via blade pitch signal bus 74. The hub 40 is mechanically connected to a turbine main-shaft 46, which transmits the turbine's torque to a gearbox 48. There is a sensor for measuring turbine speed 54 on the low speed shaft, the output of which is the shaft speed 56. The turbine shaft is coupled via gearbox 48 and some suitable coupling device to, in this example, a permanent magnet or wound field synchronous generator. The generator electrical output is connected to block 50, which includes a rectifier, which converts the electrical power to DC voltage and current $I_{(wind)}$ on a DC bus. The DC bus is connected to wind turbine generator (WTG) inverter. The inverter regulates the DC current and by doing so, the generator torque is controlled. The inverter regulates this DC current by synchronizing to the grid and by supplying unity power factor current into the grid system. The control of the inverter (within block 50) is provided by a generator control unit (GCU) 62. The GCU takes inputs such as grid voltage, DC bus voltage, grid current load power demand $I_{(demand\ in)}$ from the Supervisory Control and Data Acquisition (SCADA) interface 64, and commands such as torque level from a Turbine Control unit (TCU) 60. These inputs are converted into pulse-width-modulated (PWM), signals which tell a switch in the inverter 50 when to turn on and off. These switches are controlled in such a way as to maintain regulated DC current output $I_{(demand\ out)}$. Line filters on the inverter output are then used to reduce any harmonics that may have been generated by the inverter before passing power to a pad-mount transformer 52 on the utility grid.

As shown in the above-referenced application Ser. No. 10/773,851 (U.S. Pat. No. 7,042,110) the TCU 60 and GCU 62 work together in a multiple generator system to stage the generators, when the turbine is operating at less than full power rating. The controller brings each generator of the plurality of synchronous generators in the turbine online sequentially in the event of low energy conditions of the source of energy (wind, water, etc.) to improve system efficiency at low power. The controller may optionally alternate the sequence in which the controller shifts the order in which the generators are brought online such that each generator receives substantially similar utilization.

The TCU 60 receives sensor information provided by sensor inputs 58 such as turbine speed, blade pitch angle, tower acceleration (vibration), nacelle acceleration (nacelle vibration), wind speed, wind direction, wind turbulence, nacelle position, AC line parameters, DC bus voltage, generator voltage, power output, and other fault related sensors. The TCU 60 has control of the principle actuators on the turbine; the generators via the GCU 62, the pitch unit (PCU) 66 and the Blade Extension Control Unit (ECU) 68. The TCU 60 performs a complicated, coordinated control function for both of these elements, and does so in a way, which maximizes the energy capture of the turbine while minimizing the machine's mechanical loads. Finally, the TCU 60 also controls a yaw system, which works to keep the turbine always pointed into the wind. The TCU 60 is also in communication with the turbine's SCADA system 64 in order to provide and receive sensor and status information.

The Turbine Control Unit (TCU) and Generator Control Unit (GCU) command the proper generator torque required based on the rotor speed and power output of the turbine inverter system as well as providing any active damping requirements. Torque control is accomplished through inverter current commands generated by the TCU and GCU. In high winds the turbine remains at a constant average output power through a constant torque command from TCU and GCU and the TCU provides a varying pitch command to the hub mounted pitch servo system.

These control commands can be independent or can be a part of a State-Space Control logic. In this circumstance, the torque and speed are a subset of the turbine state space that include other parameters such as pitch rate, pitch acceleration and various turbine loads.

The control system governs the variable rotor radius, the pitch of the rotor blades, and the rotational rate of said rotor. The TCU 60 determines a pitch angle for the blades by means of an algorithm or lookup tables. A blade pitch command 70 is sent from the TCU 60 to the Blade Pitch Control Unit (PCU) 66 which generates blade rotation drive signals D1, D2, D3, which pass over bus 74 to each of three servo motors that turn their respective blades.

The TCU 60 also determines the desired position of the extendable/retractable blade extensions 44 by means of an algorithm or lookup tables. An extension command is sent by the TCU 60 to the Blade Extension Control Unit (ECU) 68 which generates blade extension drive signals E1, E2, E3, which pass over bus 74 to each of three servo motors that extend/retract their respective blade extensions.

Turbine Control Unit

U.S. Pat. No. 6,726,439 to Mikhail, et al. granted Apr. 27, 2004 for "Retractable rotor blades for power generating wind and ocean current turbines and means for operating below set rotor torque limits" discloses a wind turbine in which the rotor comprises a plurality of blades, wherein the blades of are variable in length to provide a variable diameter rotor.

In U.S. Pat. No. 6,726,439 the rotor diameter is controlled to fully extend the rotor at low flow velocity and to retract the rotor as flow velocity increases such that the loads delivered by or exerted upon the rotor do not exceed set limits. The mechanical torque (or thrust) delivered by the rotor is controlled such that the torque (or thrust) is limited to below a threshold value. This has the advantage of enabling an extended rotor blade configuration to operate within adjustable torque and thrust load limits. This enables adaptation to a multitude of wind turbine powertrain manufacturers' designs or to a variety of operating conditions through use of different control set points, and similarly enables retrofit of existing installed wind turbines.

The control system governs the variable rotor radius, the pitch of the rotor blades, and the rotational rate of the rotor, using one or more of the following sensor inputs:

measurement of power output;

measurement of rotor rotational velocity;

measurement of rotor torque;

measurement of extendable rotor blade position;

measurement of rotor blade pitch angle;

measurement of rotor blade bending load; and, measurement of bending loads upon a support structure.

SUMMARY

What has been described is a fluid flow power generating system, the fluid power being for example, wind or water current. A turbine is mounted on a structure that is held stationary with reference to the fluid flow, on a wind tower or tethered under water. The turbine includes a rotor having a root blade connected to a rotor hub and an extender blade mounted within the root blade, the turbine being positioned on the structure such that the rotor is in alignment with fluid flow direction. The extender blade is moveable between a position at least partially retracted and an exposed position relative to the root blade. An adjusting device for the extender blade includes a servomotor-controlled rack and pinion actuation mechanism that converts rotation of the pinion by the servomotor into linear motion of the extender blade. A generator is connected to the turbine for generating electrical energy.

While the invention has been particularly shown and described with reference to preferred embodiments thereof, it will be understood by those skilled in the art that the foregoing and other changes in form and detail may be made therein without departing from the scope of the invention.

What is claimed is:

1. A fluid-flow power generating system comprising:
    a turbine mounted on a structure that is held stationary with reference to a fluid flow;
    said turbine having a rotor comprised of a rotor hub and a number of blades, said rotor being positioned on said structure such that said rotor is in alignment with fluid flow direction;
    each of said blades having a root blade with a hub end attached to said rotor hub and an extender blade that is variable in length to provide a variable diameter rotor;
    said extender blade capable of extension and retraction of a radius of sweep of said rotor blade to increase and decrease a cross-sectional area of fluid flow swept by said rotor blade;
    an adjusting device for said rotor blade including a servomotor-controlled rack gear and pinion gear actuation mechanism, said rack gear being attached to said extender blade;
    said servomotor-controlled rack gear and pinion gear actuation mechanism including a first servomotor and first pinion engaging gear on one side of said rack gear and a second servomotor and pinion engaging gear on a side opposite to said one side of said rack gear;
    said first and second servomotors being anchored at said hub end of said root blade;
    said root blade has spaced apart ribs defining an airfoil contour of said root blade and a lengthwise front spar and rear spar to which said ribs are attached; and
    said extender blade is housed within said root blade with bearings, which allow said extender blade to move within a space between said front and rear spars.

2. The fluid flow power generating system of claim 1 wherein said first and second servomotors are actuatable to selectively extend said extender blade at low flow velocity and retract said extender blade as flow velocity increases such that the loads delivered by or exerted upon said rotor do not exceed set limits.

3. A blade for a fluid-power generating system, characterized by:
    a root blade having a hub end;
    an extender blade;
    a rack gear having teeth on one side and teeth on a side opposite to said one side;
    a first servomotor and first pinion located on said one side of said rack gear; and
    a second servomotor and second pinion located on said side opposite to said one side of said rack gear;
    said rack gear engaging said first and second pinions on a hub end of said root blade, said rack gear being connected on an opposite end to said extender blade;
    said first servomotor capable of driving said first pinion such that as said first pinion rotates about a fixed axis, said rack gear and extender blade move in a straight path in one direction;
    said second servomotor capable of driving said second pinion such that as said second pinion rotates about a fixed axis, said rack gear and extender blade move in a straight path in a direction opposite to said one direction, wherein said extender blade is housed within said root blade with rolling bearings, which allow said extender blade to move within a space defined in said root blade, wherein said rolling bearings are mounted via respective axles on said extender blade.

4. The fluid flow power generating system of claim 3 wherein a friction brake locks said rack gear upon a condition that said extender blade is in a desired position.

5. The combination in accordance with claim 1 wherein:
    said extender blade is mounted by said bearings located on said extender blade and guided by a front rail built into said front spar of said root blade and a rear rail built into said rear spar of said root blade.

6. The combination in accordance with claim 3 wherein:
said root blade has spaced apart ribs defining an airfoil contour of said root blade and a lengthwise front spar and rear spar to which said ribs are attached; and
wherein said extender blade moves between said front and rear spars.

7. The combination in accordance with claim 6 wherein:
said extender blade is mounted by said bearings located on said extender blade and guided by a front rail built into said front spar of said root blade and a rear rail built into said rear spar of said root blade.

8. A rotor for a fluid-power generating system, comprising:
a rotor hub;
a main blade connected to said rotor hub;
an extender blade movable in relation to said main blade between a first end position at least partially retracted in relation to said main blade and a second end position in which it is extended in relation to said main blade,
wherein said extender blade is housed within said main blade with a plurality of bearings, which allow said extender blade to move within a space defined between front and rear spars of said main blade,
an adjusting device for said extender blade, said adjusting device comprising:
a rack gear having a first end connected to said extender blade and a second end, said rack gear including a first side comprising teeth and a second, opposite side comprising teeth,
a first servomotor and a first pinion, said first pinion engaging teeth on said rack gear first side,
a second servomotor and a second pinion, said second pinion engaging teeth on said rack gear second side.

9. The rotor of claim 8 further comprising a guide and wherein said bearings cooperate with said guide.

10. The rotor of claim 9 wherein said guide is defined in said main blade such that said extender blade is housed in said main blade.

11. The rotor of claim 8 wherein said bearings are mounted to said extender blade.

12. The rotor of claim 8 wherein said bearings comprise rolling bearings.

13. The rotor of claim 8 wherein a set of said plurality of bearings is mounted to said extender blade adjacent each of a first edge and a second, opposite, edge of said extender blade.

14. The rotor of claim 8 wherein said adjusting device is mounted adjacent a hub end of said main blade.

* * * * *